United States Patent
Wojick et al.

(10) Patent No.: US 10,753,487 B2
(45) Date of Patent: Aug. 25, 2020

(54) CONTAMINATION RESISTANT POPPET VALVE

(71) Applicant: GE Energy Control Solutions, LLC, Longmont, CO (US)

(72) Inventors: Troy Gilchrist Wojick, Boulder, CO (US); Adam Virkler, Erie, CO (US); Terry Bailey, Schenectady, NY (US); Daniel John Nosek, Glenville, NY (US); John Foundoulis, Fort Collins, CO (US); Brent Dietrich, Timnath, CO (US)

(73) Assignee: GE Energy Control Solutions, LLC, Broomfield, CO (US)

( * ) Notice: Subject to any disclaimer, the term of this patent is extended or adjusted under 35 U.S.C. 154(b) by 14 days.

(21) Appl. No.: 15/942,090

(22) Filed: Mar. 30, 2018

(65) Prior Publication Data
US 2018/0299019 A1 Oct. 18, 2018

Related U.S. Application Data

(60) Provisional application No. 62/486,096, filed on Apr. 17, 2017.

(51) Int. Cl.
*F16K 11/07* (2006.01)
*F15B 20/00* (2006.01)
(Continued)

(52) U.S. Cl.
CPC ............ *F16K 11/07* (2013.01); *F15B 20/008* (2013.01); *F15B 13/042* (2013.01); *F15B 13/043* (2013.01);
(Continued)

(58) Field of Classification Search
CPC .... F16K 15/066; F16K 11/07; F16K 11/0712; F16K 11/0708; F15B 20/008;
(Continued)

(56) References Cited

U.S. PATENT DOCUMENTS 4,494,572 A 1/1985 Loveless
4,574,844 A 3/1986 Neff et al.
(Continued)

FOREIGN PATENT DOCUMENTS

CN 101551025 A 10/2009
CN 102494155 A 6/2012
(Continued)

OTHER PUBLICATIONS 4-way, 2-position, solenoid-operated directional spool valve with closed transition and position switch, Retreived from the Internet URL: https://www.sunhydraulics.com/model/DNCAZ, pp. 1-11 (Oct. 24, 2018).
(Continued)

*Primary Examiner* — Kelsey E Cary
(74) *Attorney, Agent, or Firm* — Mintz Levin Cohn Ferris Glovsky and Popeo, P.C.

(57) ABSTRACT

A multi-way poppet valve and methods for using the same are provided. In one embodiment, the poppet valve includes a manifold and a poppet assembly including an inner poppet and an outer poppet defining one or more lands. The poppet assembly can dimensioned for receipt within a bore of the manifold and configured to move longitudinally within the manifold. The inner poppet and the outer poppet can also be formed in two separate pieces that are capable of moving with respect to one another. This design can allow the lands of the poppet assembly to form fluid-tight seals (e.g., metal-metal, metal-gasket, etc.) with the manifold. In this manner, the poppet valve can move longitudinally between open and
(Continued)

closed positions where the fluid-tight seals respectively allow or inhibit fluid flow between selected ports of the valve.

18 Claims, 6 Drawing Sheets

(51) Int. Cl.
*F15B 13/042* (2006.01)
*F15B 13/044* (2006.01)
*F15B 13/04* (2006.01)
*F15B 13/043* (2006.01)

(52) U.S. Cl.
CPC ....... *F15B 13/044* (2013.01); *F15B 2013/041* (2013.01); *F15B 2013/0409* (2013.01); *F15B 2211/20592* (2013.01); *F15B 2211/265* (2013.01); *F15B 2211/8636* (2013.01)

(58) Field of Classification Search
CPC ....... Y10T 137/8671; Y10T 137/86582; Y10T 137/86606
USPC ............................ 137/625.69, 625.6, 625.63
See application file for complete search history.

(56) References Cited

U.S. PATENT DOCUMENTS

| | | | |
|---|---|---|---|
| 4,823,842 A | 4/1989 | Toliusis | |
| 4,842,020 A | 6/1989 | Tinholt | |
| 4,971,115 A | 11/1990 | Tinholt | |
| 5,400,816 A | 3/1995 | Gerstenberger | |
| 6,095,187 A | 8/2000 | Hotchkiss | |
| 6,330,798 B1 | 12/2001 | Stephenson | |
| 6,668,861 B2 | 12/2003 | Williams | |
| 8,684,037 B2 | 4/2014 | Huynh | |
| 2002/0074042 A1 | 6/2002 | Olivas et al. | |
| 2006/0174948 A1 | 8/2006 | Caruso | |
| 2008/0217573 A1 | 9/2008 | Pulcini et al. | |
| 2009/0173901 A1* | 7/2009 | Cyrot | F15B 13/0403 251/59 |
| 2013/0019958 A1* | 1/2013 | Miyazoe | F16K 11/02 137/115.1 |
| 2013/0087729 A1* | 4/2013 | Bento | F15B 13/0402 251/282 |
| 2015/0252908 A1 | 9/2015 | Nagasaki et al. | |
| 2015/0330474 A1* | 11/2015 | Rubitzko | F16F 9/43 141/61 |
| 2016/0230678 A1 | 8/2016 | Layne | |

FOREIGN PATENT DOCUMENTS

| | | |
|---|---|---|
| KR | 10-2010-0109879 A | 10/2010 |
| WO | 2014/033496 A1 | 3/2014 |

OTHER PUBLICATIONS

International Search Report and Written Opinion issued in connection with corresponding PCT Application No. PCT/US2018/027893 dated Jul. 10, 2018.

* cited by examiner

CONTAMINATION RESISTANT POPPET VALVE

CROSS-REFERENCE TO RELATED APPLICATIONS

This application claims the benefit of U.S. Provisional Patent Application No. 62/486,096, filed on Apr. 17, 2017, entitled "Contamination Resistant Poppet Valve," the entirety of which is incorporated by reference.

BACKGROUND

Valves are devices that can regulate, control, and direct flow of fluids, such as liquids and gases. In general, valves can operate by opening, closing, and/or partially obstructing passageways leading into and out of the valve. However, the performance of valves can become degraded over time, exhibiting slow reaction time and/or failure to close passageways completely when needed.

SUMMARY

In general, systems and methods are provided for directional control of fluids.

In one embodiment, a valve is provided and can include a valve body, first and second ports, and a poppet assembly. The valve body can include a longitudinal bore extending therethrough between first and second longitudinally opposed ends. The first and second ports can extend through the valve body and each can be configured for fluid communication with the bore. The poppet assembly can be longitudinally slidable within the bore between an open position and a closed position in response to an actuating force. The poppet assembly can include an inner poppet including a first land circumferentially dimensioned to engage the bore and an outer poppet having a longitudinal channel with a portion of the inner poppet received therein. The outer poppet and the portion of the inner poppet received within the outer poppet can define a second land that is longitudinally spaced from the first land and circumferentially dimensioned to engage the bore along a portion of its length. The inner poppet and the outer poppet can be movable by a selected amount with respect to one another in response to actuation of the poppet assembly such that the first and second lands each form substantially fluid-tight circumferential seals with the bore. The first and second lands can inhibit flow of a fluid between the first and second ports in the closed position and can permit flow of a fluid between the first and second ports in the open position.

In another embodiment, in the closed position, a first substantially fluid-tight circumferential seal formed between the first land and the bore can inhibit fluid flow between the first and second ports, and, in the open position, the first substantially fluid-tight circumferential seal can allow fluid flow between the first and second ports.

In another embodiment, a third port and a fourth port can be formed in the valve body. In one aspect, in closed position, a second substantially fluid-tight circumferential seal formed between the second land and the bore can inhibit fluid flow between the third and fourth ports. In another aspect, in the open position, the second substantially fluid-tight circumferential seal can allow fluid flow between the third and fourth ports. In a further aspect, the first substantially fluid tight circumferential seal can inhibit fluid flow between the second and third ports in both the open and closed positions.

In another embodiment, the valve can include a first sensor and a second sensor. The first sensor can be positioned adjacent to the first end of the valve body and a second sensor can be positioned adjacent to the second end of the valve body. The first sensor can be configured to output a first signal when the poppet assembly moves to the open position. The second sensor can be configured to output a second signal when the poppet assembly moves to closed position.

In another embodiment, the valve can include a first actuator and a second actuator. The first actuator can be configured to apply a first actuating force to the poppet assembly that urges the poppet assembly to move towards the open position. The second actuator can be configured to apply a second actuating force to the poppet assembly that urges the poppet assembly to move towards the closed position.

In another embodiment, the poppet assembly can maintain a substantially constant longitudinal position absent application of the first or second actuating forces.

In another embodiment, the valve can include a biasing member configured to apply a biasing force to the poppet assembly that urges the poppet assembly towards one of the open position and the closed position. The valve can also include a single actuator, different from the biasing member, and configured to apply an actuation force to the poppet assembly in a direction that opposes the biasing force. The biasing force can urge the poppet assembly towards the open position.

In another embodiment, a method of directional fluid control is provided. The method can include placing one of a first port and a second port of a valve body into fluid communication with a first fluid source. Actuating a poppet assembly disposed within a bore of the valve body can cause the poppet assembly to move longitudinally between open and closed positions. An inner poppet and an outer poppet of the poppet assembly can move with respect to one another during actuation of the poppet assembly. First and second longitudinally offset lands defined respectively by the inner and outer poppets can form respective first and second substantially fluid-tight circumferential seals with the bore. The first substantially fluid-tight circumferential seal can inhibit flow of a first fluid from the first fluid source between the first and second ports when the poppet assembly is in a closed position. The first substantially fluid-tight circumferential seal can allow flow of the first fluid between the first and second ports when the poppet assembly is in the open position.

In another embodiment, the method can include placing one of a third port and a fourth port of the valve body into fluid communication with a second fluid source. The second substantially fluid-tight circumferential seal can inhibit flow of a second fluid from the second fluid source between the third port and the fourth port when the poppet assembly is in the closed position. The second substantially fluid-tight circumferential seal can allow flow of the second fluid between the third and fourth ports when the poppet assembly is in the open position.

In another embodiment, the first substantially fluid-tight circumferential seal can inhibit flow of the first fluid and the second fluid between the second port and the third port when the poppet assembly is in both the open and the closed positions.

In another embodiment, the method can include detecting, by a proximity sensor, the position of the poppet assembly in the open or the closed position and transmitting, by the proximity sensor, a signal containing data representing the detected open or closed position.

In another embodiment, the method can include actuating the poppet assembly to move in a first longitudinal direction in response to an actuation force applied to the poppet assembly pneumatically or electromechanically.

In another embodiment, the method can include actuating the poppet assembly to move in a second longitudinal direction, opposite the first longitudinal direction, in response to a biasing force applied to the poppet assembly by a spring. As an example, the biasing force can urge the poppet assembly to move towards the open position when the biasing force exceeds the actuation force.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Directional control valves are a class of valve that can receive fluids from one or more sources through inlet ports, direct the fluids through different pathways within the valve body, and cause the fluids to exit the valve through one or more outlet ports. One type of directional control valve, referred to as a spool valve, can include a valve body with a bore extending between the inlet and outlet ports and a spool positioned within the bore. By sliding the spool within the bore, the spool can block and unblock different inlet and outlet ports to control fluid flow between selected inlet and outlet ports. However, the performance of spool valves can degrade over time when used in hydraulic systems, exhibiting decreased response time and/or sticking, especially when poor quality hydraulic fluid containing contaminants is present. This degradation can necessitate an increased frequency of maintenance, which can be time consuming and costly. Accordingly, alternative valve designs employing multi-way poppet valves are presented herein that can be used as replacements for spool-type directional control valves. As discussed in greater detail below, the multi-way poppet valves can include a valve body having a bore and a poppet formed in at least two separate pieces, where each piece of the poppet is capable of moving independently of the other. The two separate pieces of the poppet can better position themselves to form fluid-tight seals with the bore, as compared to a single spool. In this manner, embodiments of the disclosed multi-way poppet valves can exhibit improved resistance to contamination, mitigating the slowing/sticking problems encountered in spool-type valves and allowing for longer intervals between maintenance.

Embodiments of multi-way valves are discussed herein with reference to four-way poppet valves suitable for use in hydraulic control applications. However, embodiments of the disclosed poppet valves can include greater or fewer fluid paths and can be employed in any fluid directing application without limit.

Figure 1:
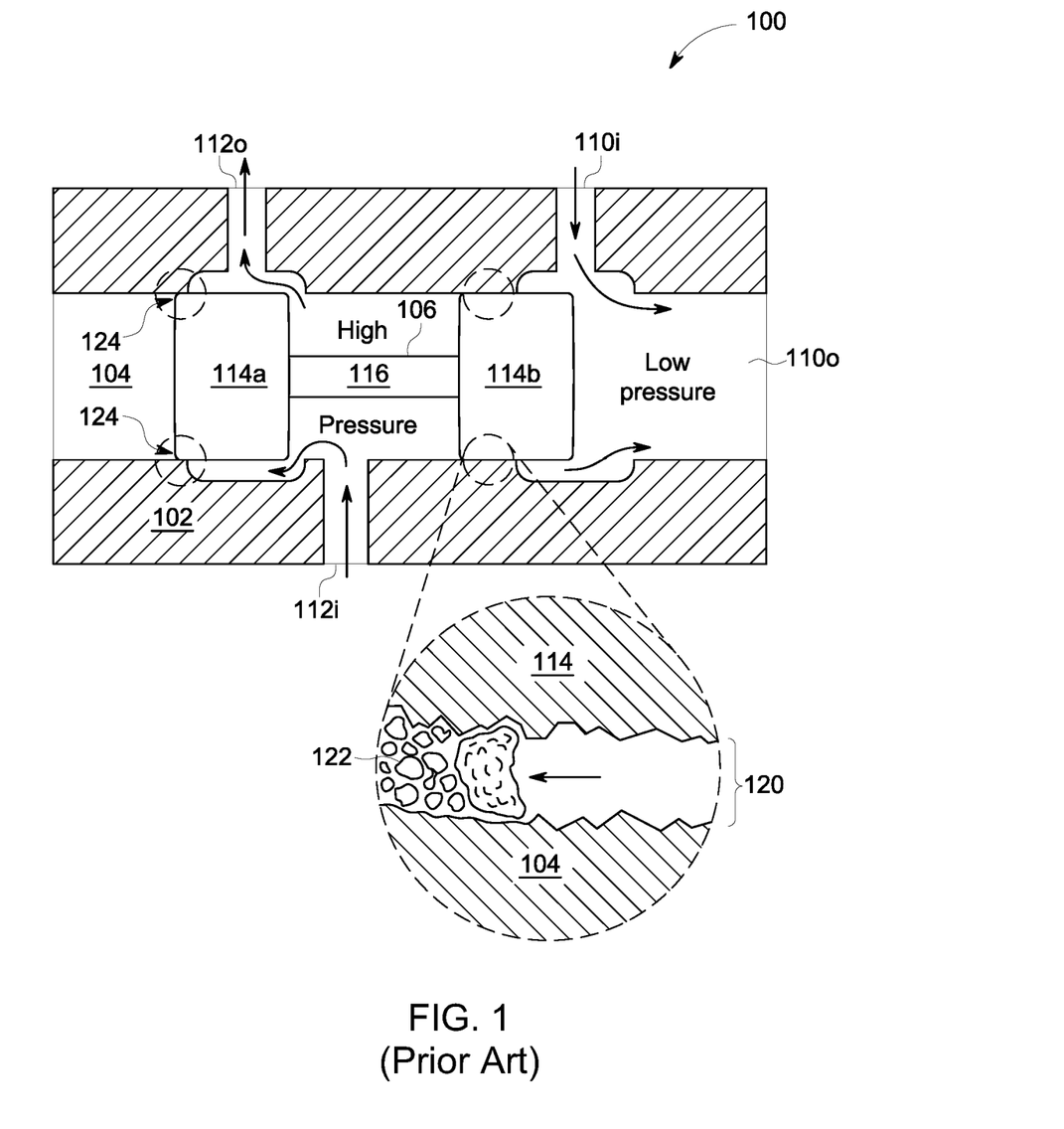
FIG. 1 is a diagram of a spool valve illustrating problems that can arise during operation due to contamination and/or poor quality fluid.

A brief discussion of problems that can be encountered in spool-type valves, and which may be addressed by one or more embodiments of the disclosed multi-way poppet valves, is presented with reference to FIG. 1. As shown, FIG. 1 illustrates a four-way spool valve 100 including a valve body 102 having a bore 104 and a spool 106 positioned within the bore 104. Four ports are formed in the valve body 102: a low pressure inlet port 110$i$, a low pressure outlet port 110$o$, a high pressure inlet port 112$i$, and a high pressure outlet port 112$o$. The spool 106 can include lands 114 (e.g., lands 114$a$, 114$b$) that block fluid passage through the valve body 102 and a groove 116 that allows fluid passage through the valve body 102. By sliding the spool 106 within the bore 104 with respect to the ports 110$i$, 110$o$, 112$i$, 112$o$, flow of the high pressure and low pressure fluids can be permitted or inhibited through the spool valve 100.

While the lands 114 can ideally form a fluid-tight seal with the bore 104, in practice, achieving a fluid-tight seal can be difficult. As an example, the bore 104 and the lands 114 can each be generally cylindrical in shape but it can be difficult to form the bore 104 in a perfectly round and straight shape. Thus, a small but finite radial gap 120, on the order of a few to tens of microns, can be present between the bore 104 and the lands 114, as illustrated in the inset of FIG. 1. As a result, a small, continuous flow of hydraulic fluid can travel between the bore 104 and the lands 114, even when the spool valve 100 is in the closed state. When contaminants 122 such as hard particles (e.g., silt) and soft particles (e.g., varnish) are present in the hydraulic fluid, they can accumulate in the gap 120 and form silt lands 124.

The performance of spool valves, such as the spool valve 100, can degrade over time due to accumulation of the contaminants 122. As an example, the performance of the spool valve 100 can be characterized in terms of quantities such as response time and/or frictional force required to move the spool 106. In one aspect, as the silt lands 124 grow, the frictional resistance against motion of the spool 106 can increase. Thus, the force required to cause the spool 106 to move can increase. In another aspect, the size of the gap 120 can vary over the length of the bore 104 due to local diameter variations, giving rise to variations in the volume of silt lands 124 along the length of the bore 104, and corresponding frictional resistance, that manifests in stick/slip behavior. That is, the spool 106 can move slowly in high friction areas of the bore 104 (stick) and relatively quickly in low friction areas of the bore 104 (slip), and the response time of the spool 106 can increase.

As the extent of the silt lands 124 increases, the frictional resistance to motion of the spool 106 can rise to a level that exceeds the maximum force that can be applied by an actuator (not shown) to move the spool 106. Under this condition, referred to as silt lock, the spool 106 can become stuck in place and unable to move. If the spool valve 100 remains in a state of silt lock for an extended period of time, the actuator can become damaged or even fail. Thus, the vulnerability of spool valves to the development of silt lands 124 and silt lock can require frequent maintenance, increasing the cost of operating the spool valve 100.

Figure 2:
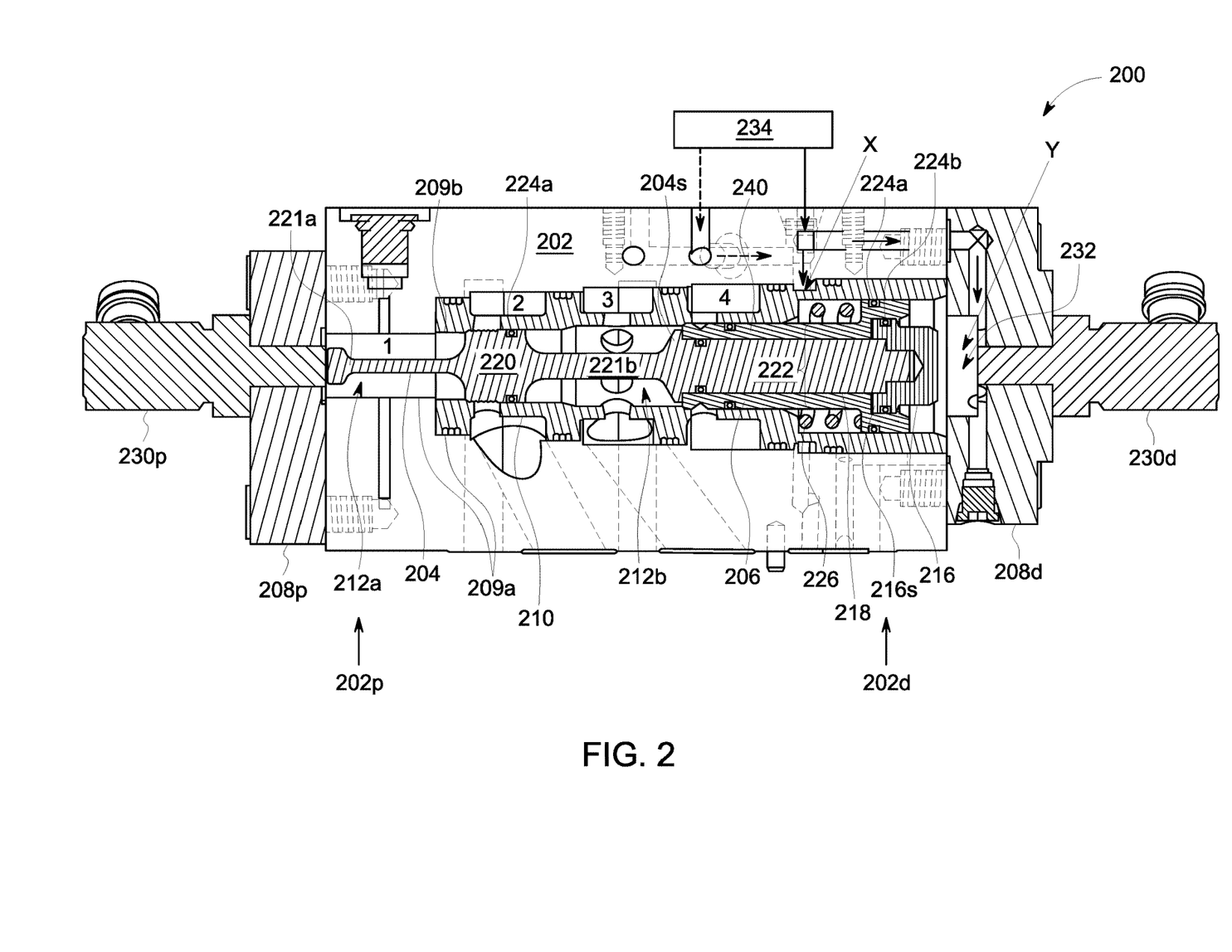
FIG. 2 is a side cross-sectional view of one exemplary embodiment of a four-way poppet valve in a closed position.
Figure 3:
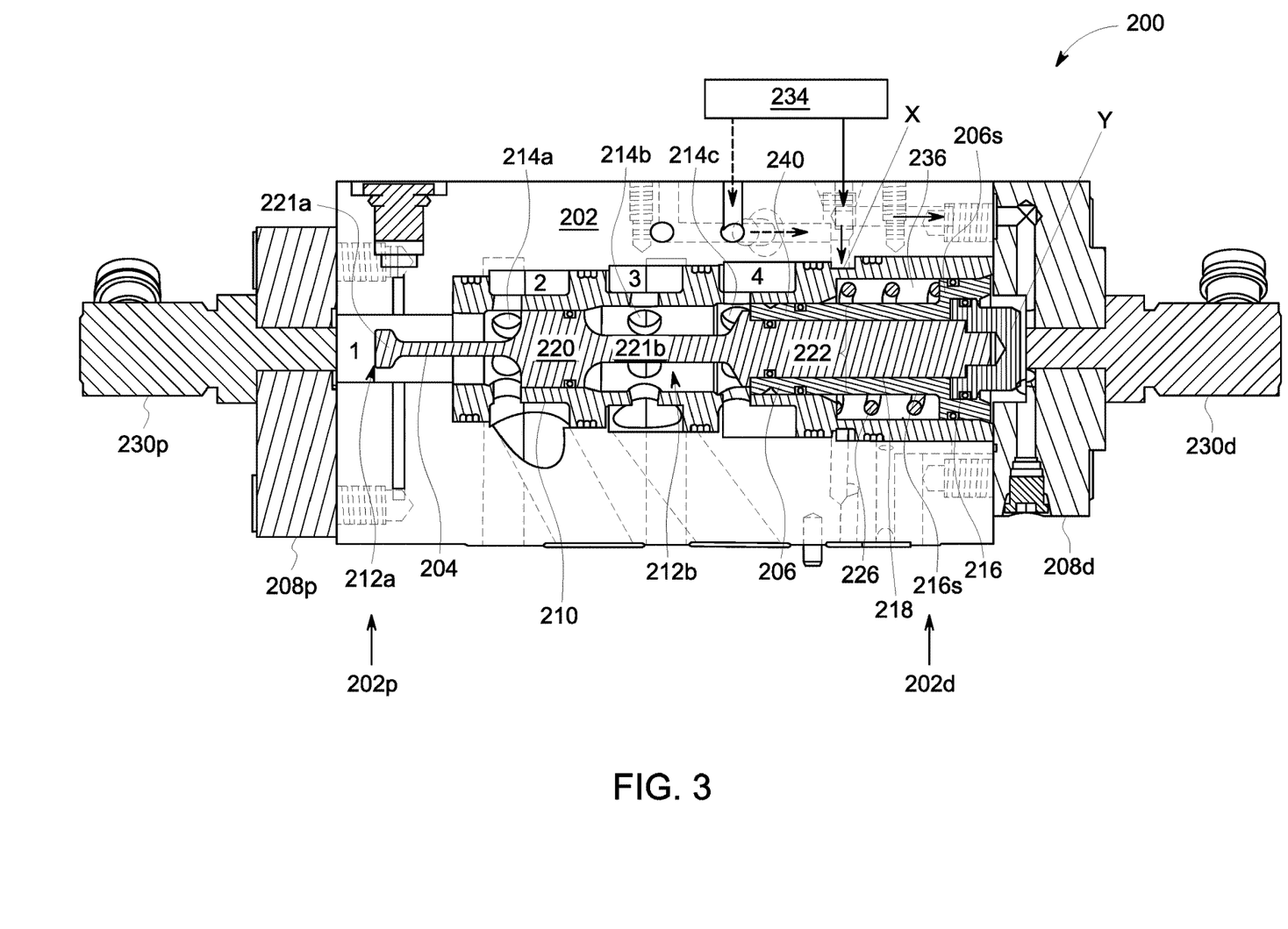
FIG. 3 is a side cross-sectional view of the four-way poppet valve of FIG. 2 in an open position.

FIGS. 2-3 illustrate an exemplary embodiment of a poppet valve 200 in closed and open positions, respectively. The poppet valve 200 can be a poppet-style valve formed in a multi-way configuration (e.g., a four-way valve including ports 1, 2, 3 and 4) and it can include a manifold 202 and a poppet assembly including an inner poppet 204 and an outer poppet 206. As discussed in detail below, the poppet assembly can be configured to move within the manifold 202 to place the poppet valve 200 in the open and closed positions to selectively allow or prohibit fluid flow through the poppet valve 200. In certain embodiments, the ports 1, 2, 3, 4 can be configured to interface with a variety of standard valve pattern styles, such as D08. In other embodiments, one or more of the ports can also be adapted and applied to other valve styles, such as D03 and D05.

Embodiments of the poppet valve 200 can be configured to provide substantially the same functionality of a spool valve (e.g., spool valve 100), with less susceptibility to slowing/sticking. As discussed below, the inner poppet 204 and the outer poppet 206 can be formed in two separate pieces that are capable of moving with respect to one another. This design can allow the poppet assembly to form fluid-tight seals (e.g., metal-metal, metal-gasket, etc.) with the manifold 202. As a result, alone or in combination with other sealing members, the poppet valve 200 can support operation in high pressure systems (e.g., about 1200 psi to about 2400 psi). Additional embodiments of the disclosed poppet valves can also be more compact than functionally equivalent multi-way valve alternatives. Beneficially, as compared to spool valves, such as spool valve 100, the ability of the poppet valve 200 to effect fluid-tight seals can avoid development of tight annular clearances in the closed position and accumulation of silt lands. Thus, resilience of the poppet valve 200 to poor fluid quality can be increased while its steady state fluid demand can be decreased.

As shown in FIGS. 2-3, the poppet valve 200 can be a hydraulically actuated valve that receives pilot pressures at pilot ports X and/or Y. As discussed in detail below, in response to receipt of a pilot pressure at pilot port X or Y, the poppet valve 200 can move into the open position or the closed position. In the open position, fluid can flow between ports 1 and 2 and between ports 3 and 4. The fluid flow can be in either direction (e.g., from port 1 to port 2 or from port 2 to port 1 and from port 3 to port 4 or from port 4 to port 3) depending upon the respective pressures of ports 1, 2, 3, and 4. In the closed position, fluid can be blocked from flow between ports 1 and 2 and between ports 3 and 4 (in the closed position).

The poppet valve 200 can include a valve body. As shown in FIGS. 2-3, the valve body can include the manifold 202, a proximal endcap 208p, a distal endcap 208d, and a sleeve 210. The proximal endcap 208p can be coupled to the proximal end 202p of the manifold 202 and the distal endcap 208d can be coupled to the distal end 202d of the manifold 202. A longitudinally extending manifold channel 209a can span the length of the manifold 202, between the proximal end 202p and the distal end 202d. The sleeve 210 can be received within a portion of the manifold channel 209a and an outer surface of the sleeve 210 can be circumferentially coupled to an inner surface of the manifold channel 209a. The sleeve 210 can include a longitudinally extending sleeve channel 209b and, when the sleeve 210 is positioned within the manifold channel 209a, the sleeve channel 209b can be approximately concentric with the manifold channel 209a. While FIGS. 2-3 illustrate the manifold 202 and the sleeve 210 as two components, in alternative embodiments of the poppet valve, the manifold and the sleeve can be integrally formed.

The valve body can further include a bore having first and second portions 212a, 212b, collectively referred to as bore 212, that extend longitudinally therethrough. As an example, the bore 212 can extend between the proximal end 202p and the distal end 202d of the manifold 202. The first bore portion 212a (e.g., a proximal portion) can be defined by the manifold channel 209a and the second bore portion 212b (e.g., a distal portion) can be defined by the sleeve channel 209b. As shown in FIGS. 2-3, the first bore portion 212a is in fluid communication with port 1 and the second bore portion 212b is in fluid communication with ports 2, 3, and 4 via openings 214a, 214b, 214c formed through the sleeve 210.

The poppet assembly can be positioned within the bore 212. As shown, the poppet assembly includes the inner poppet 204, the outer poppet 206, and a poppet cap 216. The inner poppet 204 can extend along at least a portion of the length of the manifold 202 and it can include a first land 220 coupled to a first shaft 221a and a second shaft 221b. As an example, the first shaft 221a can extend proximally from the first land 220, terminating at a proximal end of the inner poppet 204. The second shaft 221b can extend distally from the first land 220 and terminate at a distal end of the inner poppet 204. The outer poppet 206 can be longitudinally distanced from the first land 220 and include a longitudinal channel 218 dimensioned to receive a portion of the second shaft 221b. In this configuration, the portion of the inner poppet 204 received within the outer poppet 206 (e.g., the second shaft 221b) and the outer poppet 206 itself can form a second land 222. The poppet cap 216 can be coupled to distal ends of the inner poppet 204 and the outer poppet 206. In this configuration, the poppet cap 216 can form a distal terminus of the poppet assembly.

In certain embodiments, the first and second shafts 221a, 221b can be approximately co-axial with respect to one another and have a radial diameter less than that of the first and second lands 220, 222. In this manner, at least a portion of the first and second shafts 221a, 221b can each function as a groove of the poppet assembly. That is, when longitudinally aligned with a port (e.g., 1, 2, 3, and/or 4) the first and second shafts 221a, 221b can allow fluid to flow between that port and the bore 212.

Conversely, a first fluid-tight seal can be formed between the first land 220 and the bore 212 and a second fluid-tight seal can be formed between the second land 222 and the bore 212. That is, when longitudinally aligned with a port (e.g., 1, 2, 3, and/or 4) the first and second fluid tight seals can inhibit fluid flow between that port and the bore 212.

The poppet assembly can slide longitudinally within the bore 212 between a closed position and an open position to direct fluid flow through the poppet valve 200. In the closed position of FIG. 2, the first land 220 can be aligned with port 2 and the first fluid-tight seal formed by the first land 220 with the bore 212 can inhibit fluid flow between ports 1 and 2. Concurrently, the second land 222 can be aligned with port 4 and the second fluid-tight seal formed by the second land 222 can inhibit fluid flow between ports 3 and 4. In contrast, in the open position of FIG. 3, the first land 220 can be longitudinally offset from port 2 and the first shaft 221a can be aligned with ports 1 and 2, allowing fluid flow between ports 1 and 2. Similarly, the second land 222 can be longitudinally offset from port 4 and the second shaft 221b can be aligned with ports 3 and 4, allowing fluid flow between ports 3 and 4. In further embodiments, fluid flow between port 2 and port 3 can be blocked (e.g., by the first fluid-tight seal formed by the first land 220) regardless of whether the poppet valve 200 is in the open or closed position.

Embodiments of the inner poppet 204 and the outer poppet 206 can be formed as separate components. As a result, the first land 220 and the second land 222 are not rigidly coupled to one another and can move a selected amount with respect to one another. This configuration can allow the inner poppet 204 and the outer poppet 206 to accommodate any dimensional variations of the bore 212 and seat substantially completely within the sleeve 210 (e.g., in contact with the bore 212) to form the substantially fluid-tight seals (e.g., metal-metal seals). That is, tight annular clearances between the bore 212 and the poppet assembly can be substantially eliminated, inhibiting leakage flow past the first and second lands 220, 222. Thus, accumulation of silt and varnish and attendant problems such as sticking, increased response time, and silt lock can be avoided.

In further embodiments, the poppet valve 200 can include one or more sealing members. In general, the sealing member(s) can be reversibly deformable materials (e.g., elastomers) configured to facilitate formation fluid-tight seals between two or more components of the poppet valve 200 (e.g., any of the manifold 202, the inner poppet 204, the outer poppet 206, and the sleeve 210).

As an example, one or more first sealing member(s) 224a can be configured to facilitate fluid-tight sealing between the sleeve 210 and the poppet assembly. In one instance, a first sealing member 224a can be positioned between the sleeve 210 and the inner poppet 204, between port 2 and port 3. Thus, the first sealing member can operate in conjunction with the first fluid-tight seal formed by the first land 220 to inhibit fluid flow between port 2 and port 3, regardless of whether the poppet valve 200 is in the open or closed position. In another instance, first sealing member(s) 224a can be positioned between the sleeve 210 and the outer poppet 206.

As another example, one or more second sealing members 224b can be configured to facilitate fluid-tight sealing with outer poppet 206. In one instance, second sealing member(s) 224b can be positioned between the outer poppet 206 and the inner poppet 204. In another instance, second sealing member(s) 224b can be positioned between the outer poppet 206 and the poppet cap 216. While exemplary embodiments of the first and second sealing members have been illustrated and discussed above, alternative embodiments of the poppet valve can include greater or fewer sealing members, or the sealing members can be omitted, as necessary.

In certain embodiments, the poppet valve 200 can also include at least one biasing member 226. The biasing member 226 can be configured to maintain the poppet valve 200 in either the closed position of FIG. 2 or the open position of FIG. 3 absent application of a further actuating force to the poppet assembly by an actuator. The ability to maintain a predetermined default position (e.g., open or closed) absent an actuating force applied by an actuator (e.g., absent pressure in the case of pneumatic/hydraulic actuators or power in the case of a solenoid actuator) can allow the poppet valve 200 to be employed in fail-safe applications. In certain embodiments, the biasing member 226 can be a spring or spring-like member.

As shown in FIGS. 2-3, the poppet valve 200 includes a biasing member 226 in the form of a spring that is positioned proximally with respect to a proximal facing surface of the outer poppet 206 (e.g., a shoulder 206s). In this configuration, the spring can exert a biasing force on the poppet assembly in the distal direction that maintains the poppet assembly in the open position, absent application of force to overcome this biasing force and urge the poppet valve 200 into the closed position. This configuration can be referred to as a normally-open position.

In other embodiments (not shown), a spring can be positioned distally with respect to the poppet assembly (e.g., between the poppet assembly and the distal endcap). In this configuration, the spring can exert a biasing force on the poppet assembly in the proximal direction that maintains the poppet assembly in the closed position, absent application of sufficient force overcome this biasing force and urge the poppet valve to the open position. This configuration can be referred to as a normally-closed position.

While exemplary embodiments of the poppet valve 200 including the biasing member 226 have been discussed, alternative embodiments of the poppet valve can omit the biasing member. In such configurations, the poppet assembly can remain in place absent application of force to the poppet valve.

In further embodiments, the poppet valve 200 can also include at least one sensor that is configured to provide a positive indication when the poppet valve 200 is in the open or closed position, simplifying status feedback. As an example, the sensors can take the form of proximity sensors that can detect when the poppet assembly moves within a pre-selected distance of the proximity sensor. In response to this detection, the proximity sensors can further output one or more proximity signals. The proximity signals can be stored in a memory device and/or received by a monitoring device (not shown). In certain embodiments, upon receipt of a proximity signal from the one or more proximity sensors, the monitoring device can provide a notification, such as an audio indications, a visual indication, and or a text message, representing detection of the poppet valve 200 in the closed or open position.

The geometry of the poppet assembly can also be configured to limit the relative movement of the inner poppet 204 and the outer poppet 206 to within a predetermined non-zero amount to facilitate position sensing. As shown in FIGS. 2-3, the inner poppet 204 can include a distally facing shoulder 204s that is dimensioned to engage a proximally facing end of the outer poppet 206 in order to inhibit proximal motion of the outer poppet 206 with respect to the inner poppet 204. The poppet cap 216 can include proximally facing shoulder 216s that is dimensioned to engage a distally facing shoulder 206s of the outer poppet 206 in order to inhibit distal motion of the outer poppet 206 with respect to the inner poppet 204. In this manner, longitudinal sliding of the outer poppet 206 with respect to the inner poppet 204 is limited between the shoulders 204s and 216s.

As illustrated in FIGS. 2-3, the poppet valve 200 includes a distal sensor 230d and a proximal sensor 230p. The distal sensor 230d can be positioned adjacent to the distal end 202d of the manifold 202 by the distal endcap 208d. As an example, the distal sensor 230d can be coupled to the distal endcap 208d. When the poppet assembly moves to the open position, the inner poppet 204 and the outer poppet 206 can move distally and urge the poppet cap 216 into a recess 232 formed in the distal endcap 208d, adjacent to the distal sensor 230d. In response, the distal sensor 230d can generate a signal providing a positive indication the poppet valve 200 is in the open position.

The proximal sensor 230p can be secured to the proximal end 202p of the manifold 202 by the proximal endcap 208p. When the poppet assembly moves to the closed position, the inner poppet 204 moves proximally and the first shaft 221a is placed adjacent to the proximal sensor 230p. In response the proximal sensor 230p can provide a positive indication that the poppet valve 200 is in the closed position.

As also shown in FIGS. 2-3, the first pilot port X and the second pilot port Y are in fluid communication with a source of pressurized fluid (not shown) via a pilot valve 234 for actuation of the poppet assembly. The first pilot port X can extend through the manifold 202 and the sleeve 210 for fluid communication with a chamber 236 positioned between the sleeve 210 and a proximal facing surface of the poppet assembly (e.g., the shoulder 206s of the outer poppet 206). The second pilot port Y can extend through the distal endcap 208d for fluid communication with the recess 232 and a distal facing surface of the poppet assembly (e.g., the poppet cap 216). So configured, a pilot pressure (e.g., hydraulic or pneumatic) applied to the first pilot port X can urge the poppet assembly in the distal direction (e.g., the open position) and pilot pressure applied to the second pilot port Y can urge the poppet assembly in the proximal direction (e.g., the closed position). In certain embodiments, discussed below, either or both of the first and second pilot ports X and Y can be replaced by solenoid valves or solenoid coils.

The poppet valve 200 can also include a pilot vent 240. As shown in FIGS. 2-3, the pilot vent 240 extends through the outer poppet 206, between the sleeve 210 and the inner poppet 204. The pilot vent 240 can be positioned adjacent to port 4 such that, when the poppet assembly is moved to the closed position, fluid trapped between the inner poppet 204 and the outer poppet 206 can drain into port 4.

The exact manner in which the open and closed positions of the poppet valve 200 are achieved can vary, depending upon the configuration of the first and second pilot ports X, Y and the biasing member 226. Embodiments of different configurations of the poppet valve 200 are schematically illustrated in FIGS. 4A-6B. In FIGS. 4A-6B, the right-hand side corresponds to the distal direction of FIGS. 2-3 and the left-hand side corresponds to the proximal direction of FIGS. 2-3. The biasing member 226 is further illustrated as a zig-zag element. When positioned on the left-hand side of FIGS. 4A-6B, the biasing member 226 represents an embodiment of the poppet valve 200 that is biased in the distal direction (normally open). Conversely, when positioned on the right-hand side of FIGS. 4A-6B, the biasing member 226 represents an embodiment of the poppet valve 200 that is biased in the proximal direction (normally closed). The absence of the biasing member 226 on either the left-hand side or right-hand side of FIGS. 4A-6B represents an embodiment of the poppet valve 200 that is unbiased. The ports 1, 2, 3, and 4 are labeled at the position normally adopted by the poppet valve 200 absent application of pilot pressures.

Figure 4A:
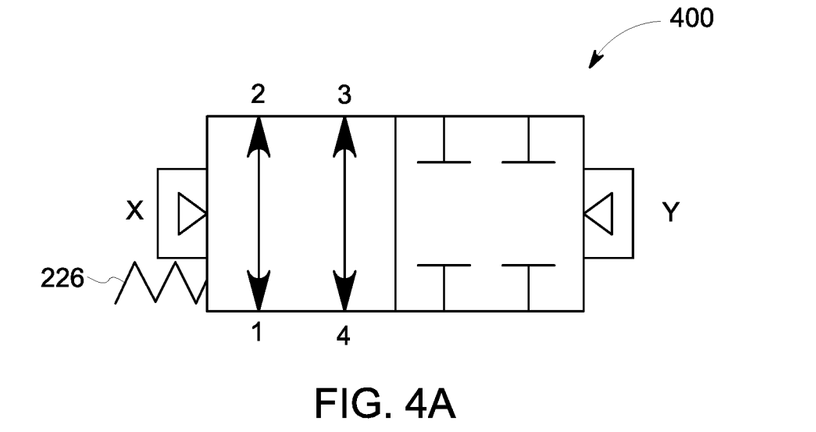
FIG. 4A is a schematic diagram illustrating an exemplary embodiment of a four-way poppet valve in a double-acting, normally-open operating configuration.
Figure 4B:
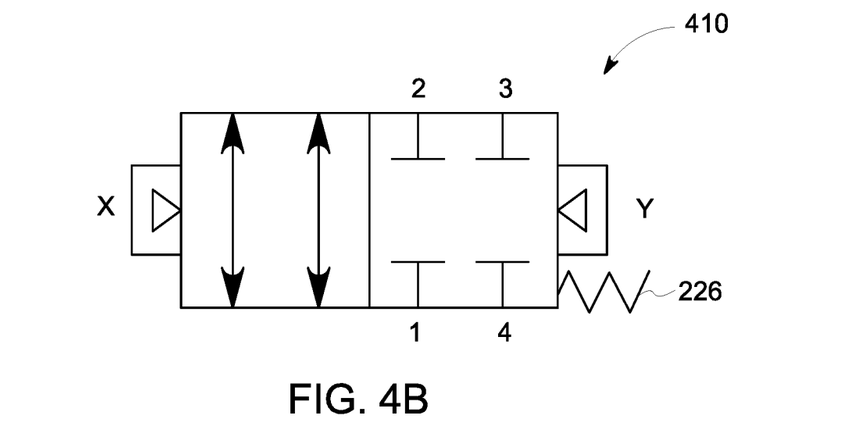
FIG. 4B is a schematic diagram illustrating an exemplary embodiment of a four-way poppet valve in a double-acting, normally-closed operating configuration.
Figure 4C:
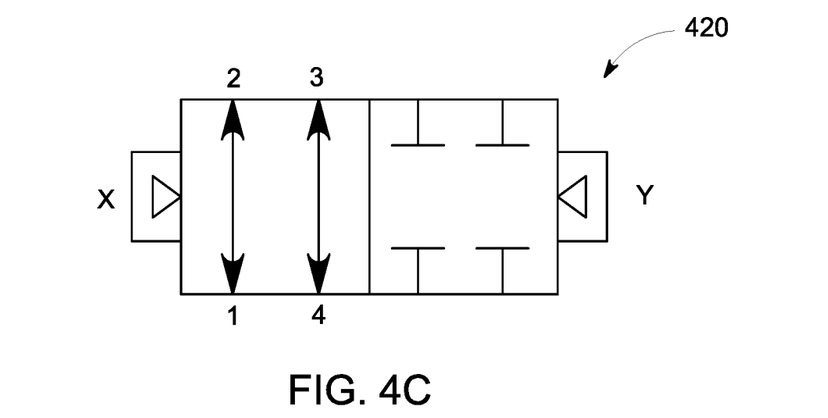
FIG. 4C is a schematic diagram illustrating an exemplary embodiment of a four-way poppet valve in a double-acting, unbiased operating configuration.

FIGS. 4A-4C illustrate embodiments of the poppet valve 200 in the form of poppet valves 400, 410, 420 having double-acting configurations that can include each of the first and second pilot ports X, Y.

FIG. 4A is a schematic illustration of the poppet valve 400, which has a normally open configuration. As shown, the biasing member 226 biases the poppet valve 400 in the distal direction. The closed position can be achieved by applying a pilot pressure to the second pilot port Y that overcomes a pilot pressure applied to the first pilot port X and the bias of the biasing member 226.

FIG. 4B is a schematic illustration of the poppet valve 410, which has a normally closed configuration. As shown, the biasing member 226 biases the poppet valve 410 in the proximal direction. The open position can be achieved by applying a pilot pressure to the first pilot port X that overcomes a pilot pressure applied to the second pilot port Y and the bias of the biasing member 226.

FIG. 4C is a schematic illustration of the poppet valve 420, which has an unbiased configuration. That is, the biasing member 226 is omitted from poppet valve 420. The open position can be achieved by applying a pilot pressure to the first pilot port X that overcomes a pilot pressure applied to the second pilot port Y. The closed position can be achieved by applying a pilot pressure to the second pilot port Y that overcomes a pilot pressure applied to the first pilot port X.

Figure 5A:
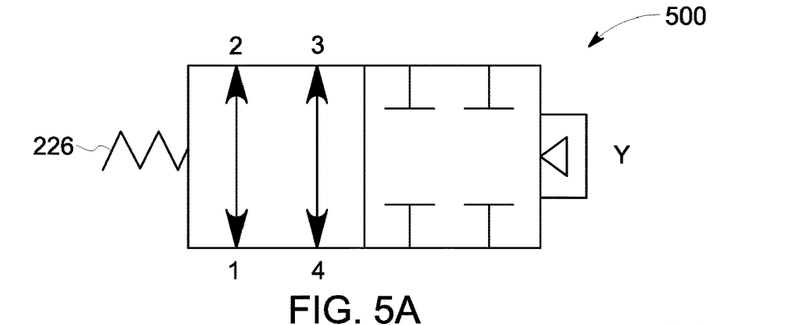
FIG. 5A is a schematic diagram illustrating an exemplary embodiment of a four-way poppet valve in a single-acting, normally open, pilot-to-close operating configuration.
Figure 5B:
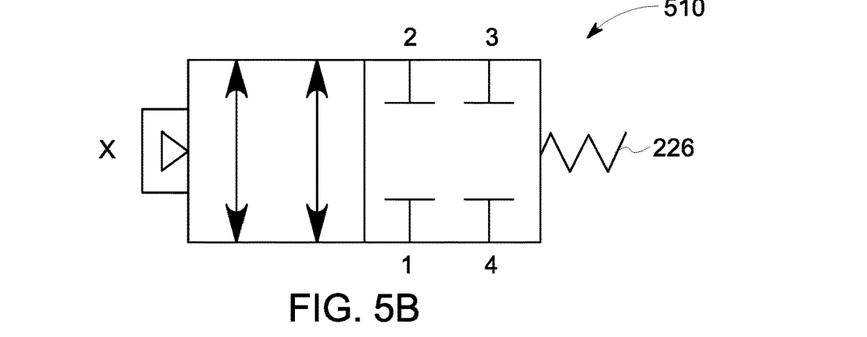
FIG. 5B is a schematic diagram illustrating an exemplary embodiment of a four-way poppet valve in a single-acting, normally closed, pilot-to-open operating configuration.

FIGS. 5A-5B illustrate embodiments of the poppet valve 200 in the form of poppet valves 500, 510 having single acting configurations that can include one of the first pilot port X or the second pilot port Y).

FIG. 5A is a schematic illustration of the poppet valve 500, which has a normally open configuration. As shown, the biasing member 226 biases the poppet valve 500 in the distal direction and the first pilot port X is omitted. The closed position can be achieved by applying a pilot pressure to the second pilot port Y that overcomes the bias of the biasing member 226.

FIG. 5B is a schematic illustration of the poppet valve 510, which has a normally closed configuration. As shown, the biasing member 226 biases the poppet valve 510 in the proximal direction and the second pilot port Y is omitted. The open position can be achieved by applying a pilot pressure to the first pilot port X that overcomes the bias of the biasing member 226.

Figure 6A:
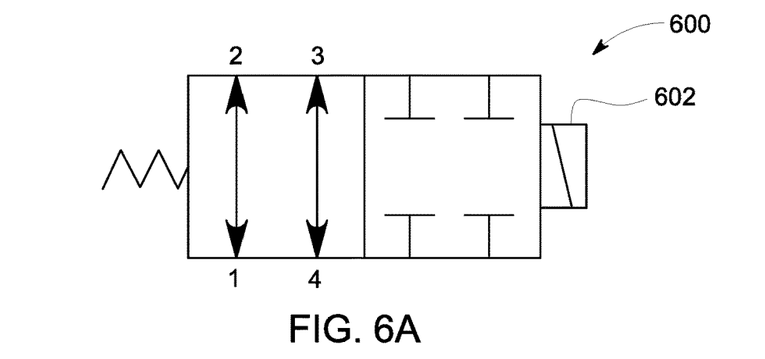
FIG. 6A is a schematic diagram illustrating an exemplary embodiment of a four-way poppet valve in a single-acting, normally open, energize-to-close operating configuration.
Figure 6B:
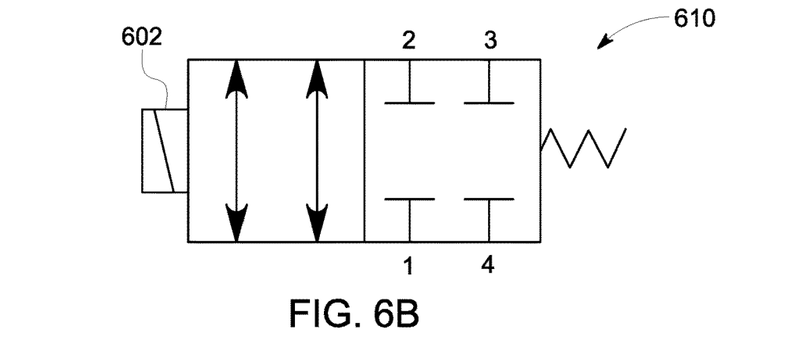
FIG. 6B is a schematic diagram illustrating an exemplary embodiment of a four-way poppet valve in a single-acting, normally closed, energize-to-open operating configuration.

FIGS. 6A-6B illustrate embodiments of the poppet valve 200 in the form of poppet valves 600, 610 in single acting configurations. FIGS. 6A and 6B can be similar to FIGS. 5A, 5B, respectively, except that the single pilots X and Y are replaced by solenoids 602.

Figure 7:
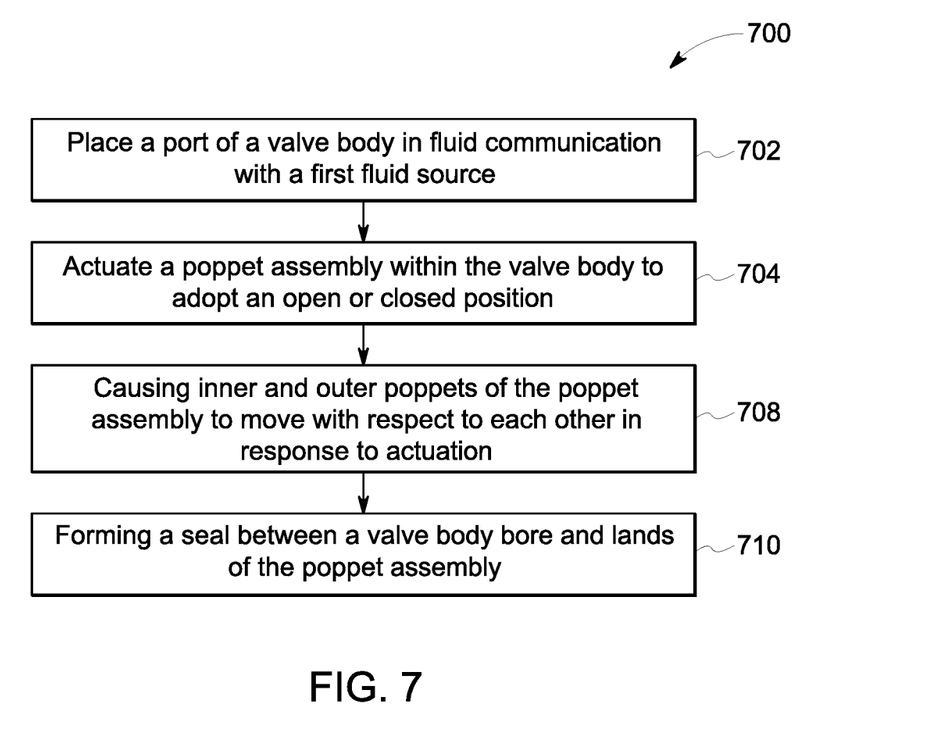
FIG. 7 is a flow diagram illustrating an exemplary embodiment of a method for directional fluid control employing a multi-way poppet valve.

FIG. 7 is a flow diagram illustrating an exemplary embodiment of a method for directional fluid control using any of the poppet valves (e.g., 200, 410, 420, 430, 500, 510, 600, 610) discussed herein. For clarity, the method 700 is described below in connection with the poppet valve 200 of FIGS. 2-3. As shown, the method 700 include operations 702, 704, 706, and 710. However, alternative embodiments of the method can include greater or fewer operations than illustrated in FIG. 7 and these operations can be performed in a different order than illustrated in FIG. 7.

In operation 702, one of a first port and a second port of a valve body (e.g., the manifold 202 and the sleeve 210) are placed in fluid communication with a first fluid source. In certain embodiments, the valve body can also include third and fourth ports and one of the third and fourth ports can be placed in fluid communication with a second fluid source. The first and second fluid sources can be different from one another. Examples of the first, second, third, and fourth ports can include ports 1, 2, 3, and 4 of poppet valve 200.

In operation 704, a poppet assembly of the poppet valve 200 can be actuated. The poppet assembly can be positioned within a bore extending longitudinally through the poppet valve 200 (e.g., bore 212) and the actuation can cause the poppet assembly to slide longitudinally within the bore 212 between a closed position and an open position. As an example, actuation in a first direction can urge the poppet assembly towards the closed position and actuation in a second direction, opposite the first direction, can urge the poppet assembly towards the open position.

In certain embodiments, an actuation force can be applied to the poppet assembly pneumatically or electromechanically. As an example, when a pressurized fluid is supplied to the pilot port Y, an actuating force can be applied to a distal facing surface of the poppet cap 216, in the first direction, to urge the poppet assembly towards the closed position. Conversely, when a pressurized fluid is supplied to the pilot port X, an actuating force can be applied to a proximal facing surface of the outer poppet 206 (e.g., shoulder 206s), in the second direction, to urge the poppet assembly towards the open position. Alternatively, one or more electromechanical devices (e.g., solenoids) can be used to apply actuation forces to the poppet assembly in the first and/or second directions.

In certain embodiments, the poppet valve 200 can also include a biasing member (e.g., 226) configured to apply a biasing force to the poppet assembly. The biasing force can be configured to urge the poppet assembly into the closed position (e.g., biasing force in the first direction) or into the open position (e.g., biasing force in the second direction) absent application of further force (e.g., by an actuator) to the poppet assembly.

In operation 706, an inner poppet (e.g., 204) and an outer poppet (e.g., 206) of the poppet assembly can move with respect to one another in response to actuation of the poppet assembly.

In operation 710, lands (e.g., 220, 222) defined by the inner poppet 204 and the outer poppet 206, alone or in combination, can form substantially fluid-tight circumferential seals with the bore 212. When the poppet assembly is actuated to adopt the closed position, at least one of a first substantially fluid-tight circumferential seal and a second substantially fluid-tight circumferential seal inhibits flow of a fluid between the first and second ports. Conversely, when the poppet assembly is actuated to adopt the open position, at least one of a first substantially fluid-tight circumferential seal and a second substantially fluid-tight circumferential seal allows fluid flow. As an example, the first substantially fluid-tight circumferential seal can inhibit fluid flow between the first and second ports in the closed position and allow fluid flow between the first and second ports in the open position.

When the third and fourth ports are present in the valve body, the second substantially fluid-tight circumferential seal can inhibit fluid flow between the third and fourth ports in the closed position and allow fluid flow between the third and fourth ports in the open position. In further embodiments, the first substantially fluid-tight circumferential seal can inhibit fluid flow between the second and third ports at all positions of the poppet assembly (e.g., in the open position).

In further embodiments, the position of the poppet assembly in the open or closed position can be detected. As an example, proximity sensors can be positioned at longitudinally opposite ends of the poppet valve 200. When the poppet assembly is positioned at the open position, a first proximity sensor can transmit a first signal containing data representing detection of the poppet assembly in the open position. Similarly, when the poppet assembly is positioned at the closed position, a second proximity sensor can transmit a second signal containing data representing detection of the poppet assembly in the closed position.

Exemplary technical effects of the methods, systems, and devices described herein include, by way of non-limiting example, multi-way poppet valves that can be resilient to contamination and poor fluid quality. In one aspect, substantially fluid-tight seals can be formed that inhibit accumulation of silt lands between the poppet assembly and the bore of the valve body. In another aspect, the absence of silt land accumulation can avoid or substantially mitigate development of stick-slip behavior, slowed response time, and/or silt lock. In a further aspect, this resilience to contamination can decrease the frequency of required maintenance, lowering the operating cost of embodiments of the disclosed multi-way poppet valves.

Certain exemplary embodiments have been described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A valve, comprising:
   a valve body including a longitudinal bore extending therethrough between first and second longitudinally opposed ends;
   a first port and a second port extending through the valve body and configured for fluid communication with the bore; and
   a poppet assembly longitudinally slidable within the bore between an open position and a closed position in response to an actuating force, the poppet assembly including,
      an inner poppet including a first land circumferentially dimensioned to engage the bore, and
      an outer poppet having a longitudinal channel extending through an entire length of the outer poppet, a portion of the inner poppet being received within the longitudinal channel,
      wherein the outer poppet defines a second land, the second land being longitudinally spaced from the first land and circumferentially dimensioned to engage the bore along a portion of its length,
      the inner poppet and the outer poppet being movable by a selected amount with respect to one another in response to actuation of the poppet assembly such that the first and second lands each form substantially fluid-tight circumferential seals with the bore;
   wherein the first and second lands inhibit flow of a fluid between the first and second ports in the closed position; and
   wherein the first and second lands permit flow of a fluid between the first and second ports in the open position.

2. The valve of claim 1, wherein, in the closed position, a first substantially fluid-tight circumferential seal formed between the first land and the bore inhibits fluid flow between the first and second ports, and wherein, in the open position, the first substantially fluid-tight circumferential seal allows fluid flow between the first and second ports.

3. The valve of claim 2, further comprising a third port and a fourth port formed in the valve body, wherein, in the closed position, a second substantially fluid-tight circumferential seal formed between the second land and the bore inhibits fluid flow between the third and fourth ports, and wherein, in the open position, the second substantially fluid-tight circumferential seal allows fluid flow between the third and fourth ports.

4. The valve of claim 3, wherein the first substantially fluid tight circumferential seal inhibits fluid flow between the second and third ports in both the open and closed positions.

5. The valve of claim 1, further comprising a first sensor positioned adjacent to the first end of the valve body and a second sensor positioned adjacent to the second end of the valve body, wherein the first sensor is configured to output a first signal when the poppet assembly moves to the open position and the second sensor is configured to output a second signal when the poppet assembly moves to closed position.

6. The system of claim 5, the poppet assembly further including a poppet cap coupled to the first end of the valve body and the valve body further including a recess dimensioned to receive the poppet cap, wherein the first sensor is configured to output the second signal when the poppet cap is received within the recess.

7. The valve of claim 1, further comprising a first actuator configured to apply a first actuating force to the poppet assembly that urges the poppet assembly to move towards the open position and a second actuator configured to apply a second actuating force to the poppet assembly that urges the poppet assembly to move towards the closed position.

8. The valve of claim 7, wherein the poppet assembly maintains a substantially constant longitudinal position absent application of the first or second actuating forces.

9. The valve of claim 1, further comprising
   a biasing member configured to apply a biasing force to the poppet assembly that urges the poppet assembly towards one of the open position and the closed position;
   wherein the biasing member is radially interposed between the valve body and the outer poppet.

10. The valve of claim 9, further comprising a single actuator, different from the biasing member, and configured to apply an actuation force to the poppet assembly in a direction that opposes the biasing force.

11. The valve of claim 9, wherein the biasing force urges the poppet assembly towards the open position.

12. A method of directional fluid control, comprising:
    placing one of a first port and a second port of a valve body into fluid communication with a first fluid source, wherein actuating a poppet assembly disposed within a bore of the valve body causes the poppet assembly to move longitudinally between open and closed positions, wherein an inner poppet and an outer poppet of the poppet assembly move with respect to one another during actuation of the poppet assembly, the outer poppet having a longitudinal channel extending through an entire length of the outer poppet and a portion of the inner poppet being received within the longitudinal channel, wherein first and second longitudinally offset lands defined respectively by the inner and outer poppets form respective first and second substantially fluid-tight circumferential seals with the bore, wherein the first substantially fluid-tight circumferential seal inhibits flow of a first fluid from the first fluid source between the first and second ports when the poppet assembly is in a closed position, and the first substantially fluid-tight circumferential seal allows flow of the first fluid between the first and second ports when the poppet assembly is in the open position.

13. The method of claim 12, further comprising placing one of a third port and a fourth port of the valve body into fluid communication with a second fluid source, wherein the second substantially fluid-tight circumferential seal inhibits flow of a second fluid from the second fluid source between the third port and the fourth port when the poppet assembly is in the closed position, and the second substantially fluid-tight circumferential seal allows flow of the second fluid between the third and fourth ports when the poppet assembly is in the open position.

14. The method of claim 13, wherein the first substantially fluid-tight circumferential seal inhibits flow of the first fluid and the second fluid between the second port and the third port when the poppet assembly is in both the open and the closed positions.

15. The method of claim 12, further comprising:
    detecting, by a proximity sensor, the position of the poppet assembly in the open or the closed position; and
    transmitting, by the proximity sensor, a signal containing data representing the detected open or closed position.

16. The method of claim 12, further comprising actuating the poppet assembly to move in a first longitudinal direction in response to an actuation force applied to the poppet assembly pneumatically or electromechanically.

17. The method of claim 16, further comprising actuating the poppet assembly to move in a second longitudinal direction, opposite the first longitudinal direction, in response to a biasing force applied to the poppet assembly by a spring.

18. The method of claim 17, wherein the biasing force urges the poppet assembly to move towards the open position when the biasing force exceeds the actuating force.

* * * * *